US009630436B2

United States Patent
Meilach et al.

(10) Patent No.: US 9,630,436 B2
(45) Date of Patent: Apr. 25, 2017

(54) PROCESS OF PRODUCING TACTILE DOTS, TACTILE DOT GROUPS, AND TACTILE IDENTIFIER MARKS

(71) Applicant: DATACARD CORPORATION, Minnetonka, MN (US)

(72) Inventors: Alan Meilach, Prior Lake, MN (US); Miles Koolmeister, Brooklyn Park, MN (US); Jeff Rust, Brooklyn Park, MN (US); Faith Rekowski, Crystal, MN (US); Dave Wirth, New Richmond, WI (US)

(73) Assignee: ENTRUST DATACARD CORPORATION, Shakopee, MN (US)

(*) Notice: Subject to any disclaimer, the term of this patent is extended or adjusted under 35 U.S.C. 154(b) by 0 days.

(21) Appl. No.: 14/227,569

(22) Filed: Mar. 27, 2014

(65) Prior Publication Data
US 2014/0366753 A1    Dec. 18, 2014

Related U.S. Application Data

(60) Provisional application No. 61/834,636, filed on Jun. 13, 2013.

(51) Int. Cl.
*B41M 3/16* (2006.01)
*G09B 21/02* (2006.01)

(52) U.S. Cl.
CPC .............. *B41M 3/16* (2013.01); *G09B 21/02* (2013.01)

(58) Field of Classification Search
CPC ... B41J 3/32; B41L 13/10; B41M 3/16; G09B 21/02
See application file for complete search history.

(56) References Cited

U.S. PATENT DOCUMENTS

| 4,397,573 A | * | 8/1983 | Thiel ......................... 400/109.1 |
| 4,519,600 A | | 5/1985 | Warwick et al. |
| 4,653,942 A | * | 3/1987 | Soloveychik et al. ...... 400/109.1 |
| 4,676,676 A | | 6/1987 | Bitoh |
| 5,193,921 A | * | 3/1993 | Tsukuda et al. ........... 400/109.1 |
| 5,222,819 A | * | 6/1993 | Tsukuda et al. ........... 400/109.1 |
| 5,336,458 A | * | 8/1994 | Hutchison et al. ........... 264/220 |
| 5,449,240 A | * | 9/1995 | Dorpfeld et al. ............. 400/127 |
| 5,803,741 A | * | 9/1998 | Deng et al. .................. 434/115 |

(Continued)

FOREIGN PATENT DOCUMENTS

| JP | 06043802 A | * | 2/1994 |
| JP | 2001005375 A | * | 1/2001 |

OTHER PUBLICATIONS

International Search Report and Written Opinion for International Application No. PCT/US2014/032147, mailed Jul. 21, 2014, 12 pgs.

*Primary Examiner* — David Banh
(74) *Attorney, Agent, or Firm* — Hamre, Schumann, Mueller & Larson, P.C.

(57) ABSTRACT

Techniques are described for the production of tactile dots, tactile dot groups, and tactile identifier marks on substrates that are tactilely recognizable by visually impaired individuals. Each tactile dot can be formed individually in the substrate, for example by separately embossing each tactile dot using a single punch and die pair. By using a single punch and die pair, the size, complexity and cost of the tactile dot embossing mechanism can be reduced, and the spacing between the tactile dots can be varied.

17 Claims, 12 Drawing Sheets

(56) References Cited

U.S. PATENT DOCUMENTS

| | | |
|---|---|---|
| 5,823,691 A | 10/1998 | Langner |
| 6,902,107 B2 | 6/2005 | Shay et al. |
| 7,434,728 B2 | 10/2008 | Paulson et al. |
| 2004/0036755 A1* | 2/2004 | Guillen et al. ................ 347/104 |
| 2006/0071420 A1* | 4/2006 | Meier ..................... B65H 5/18 |
| | | 271/272 |
| 2006/0228147 A1* | 10/2006 | Takada et al. ............ 400/109.1 |
| 2007/0160404 A1* | 7/2007 | Yin .............................. 400/109 |
| 2007/0187870 A1 | 8/2007 | Lundstrom et al. |
| 2009/0004632 A1* | 1/2009 | Yau ............................... 434/115 |
| 2009/0200385 A1* | 8/2009 | Hachey ................. G06K 19/06 |
| | | 235/494 |
| 2011/0020771 A1* | 1/2011 | Rea et al. ..................... 434/114 |
| 2011/0103864 A1* | 5/2011 | Guo et al. ................. 400/109.1 |
| 2014/0227487 A1 | 8/2014 | Warwick |

\* cited by examiner

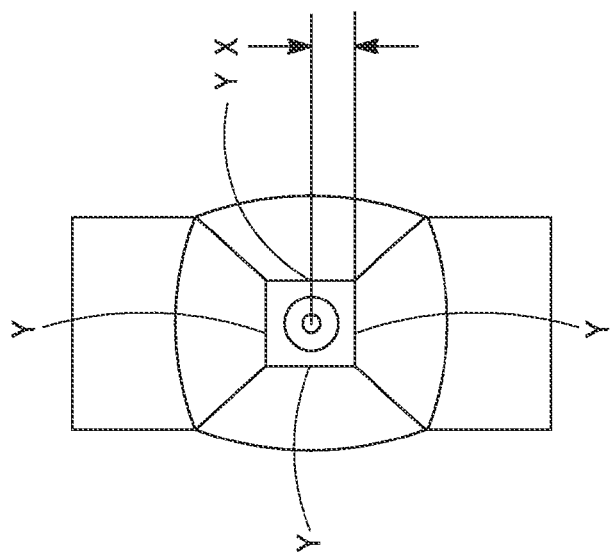
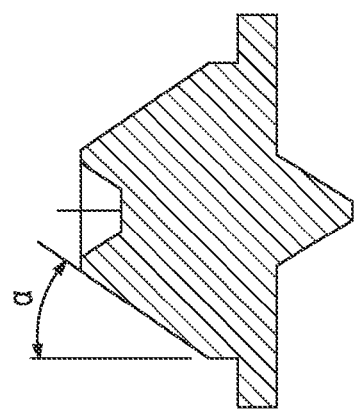
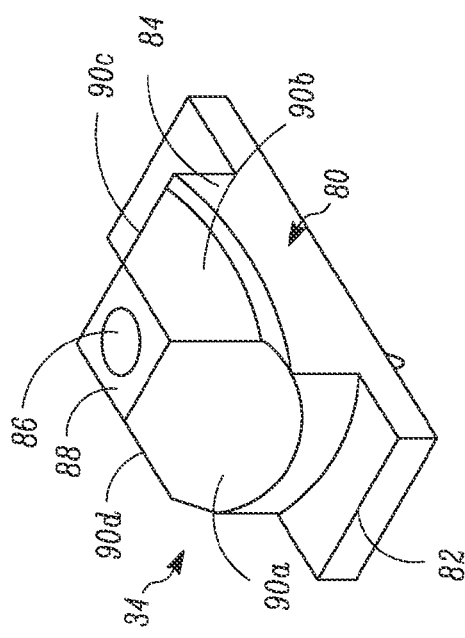
FIG. 7B
FIG. 7C
FIG. 7A

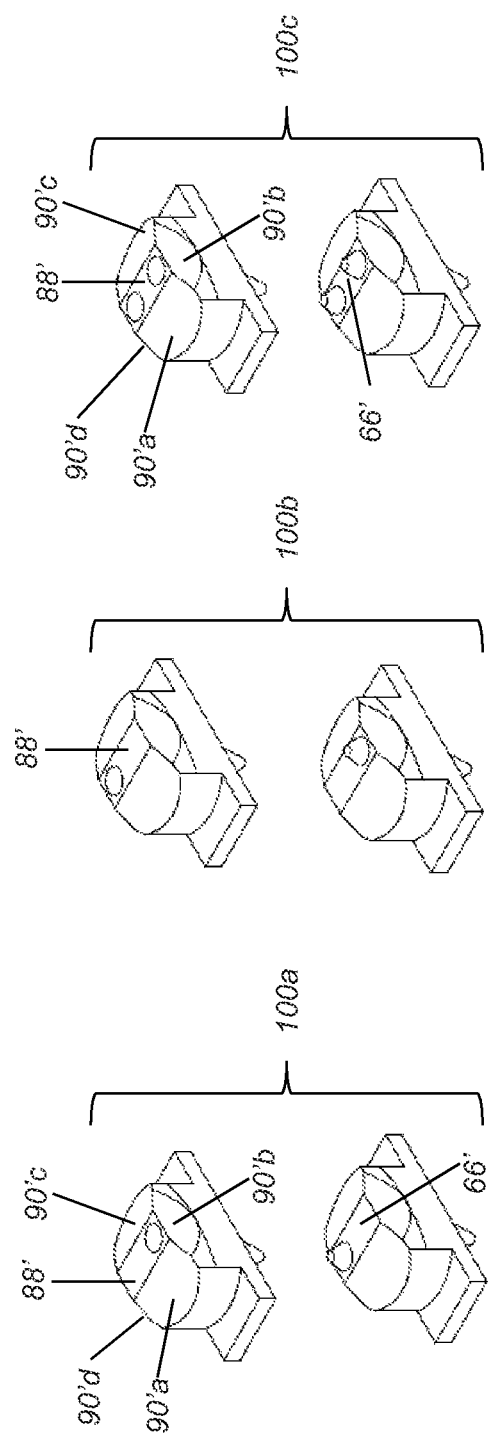

PROCESS OF PRODUCING TACTILE DOTS, TACTILE DOT GROUPS, AND TACTILE IDENTIFIER MARKS

FIELD

The technical disclosure herein relates to the production of tactile dots, tactile dot groups, and tactile identifier marks on substrates.

BACKGROUND

Tactile dots formed on substrates are used by blind and other visually impaired individuals to read, for object recognition, and the like. The tactile dots are arranged in pre-defined patterns to form tactilely recognizable characters or codes. An example of the use of tactile dots and tactile dot groups is Braille characters.

The ISO/IEC 7811-9 standard specifies the location and characteristics of a tactile identifier mark on plastic cards that are used by visually impaired individuals to distinguish their cards.

In the past, tactile dots on plastic cards were formed using embossing mechanisms that included multiple punch and die pair combinations which increases the size of the mechanism required to form all the possible characters of a 6 dot group. In addition, using multiple punch and die pairs can limit the spacing between adjacent dots to a pre-determined distance for each tactile dot group/character to be formed.

SUMMARY

This technical disclosure relates to the production of tactile dots, tactile dot groups, and tactile identifier marks on substrates that are tactilely recognizable by visually impaired individuals.

In one embodiment, each tactile dot is formed individually in the substrate, for example by separately embossing each tactile dot using a single punch and die pair. By using a single punch and die pair, the size, complexity, and cost of the tactile dot embossing mechanism can be reduced. In addition, forming each tactile dot individually permits the spacing between adjacent dots to be varied in both X and Y directions.

In another embodiment, each tactile dot is formed by a mechanism other than embossing, for example using a laser.

In another embodiment, in a tactile dot group containing a plurality of tactile dots, the tactile dots of the tactile dot group are created in separate steps. For example, one or more tactile dots of the dot group are created in a first step, and one or more additional tactile dots of the dot group are created in a second step. Third, fourth, etc. steps can be used to form additional tactile dots of the dot group. This same process is used to create the tactile dots of each tactile dot group.

As used in this disclosure and claims, unless otherwise indicated, a tactile dot is a single dot used in a tactile identifier mark (TIM). A tactile dot is a structure that is raised in relief from a surface of a substrate for the purpose of being tactilely recognized by a visually impaired individual. A tactile dot is substantially circular when viewed in top plan view, but in side view can have any shape. In one embodiment, the tactile dots have a minimum relief height of about 0.3 mm and a maximum relief height of about 0.48 mm.

As used in this disclosure and claims, unless otherwise indicated, a tactile dot group is a group of one or more tactile dots that are arranged to form a recognizable character. In one example, each tactile dot group has a maximum of up to 6 tactile dots or a maximum of up to 8 tactile dots. When a tactile dot group is referred to herein as a 6 or 8 dot tactile dot group, this means that the tactile dot group includes at least one tactile dot up to a maximum of 6 or 8 tactile dots, respectively. In a 6 or 8 dot tactile dot group, the tactile dots are arranged in two side-by-side columns (e.g. a 6-dot tactile dot group containing a maximum of 3 tactile dots in each column, while an 8-dot tactile dot group includes a maximum of 4 tactile dots in each column).

As used in this disclosure and claims, unless otherwise indicated, a TIM is an arrangement of one or more tactile dot groups in a coding system used by the visually impaired. A TIM includes TIMs as defined in ISO 7811-9 and Braille characters. In the case of plastic cards, a TIM can identify a particular card as being a Visa branded card, or a Mastercard branded card, or the like. A TIM may also identify a card as being a debit/stored value card, or identify the type of card such as a credit card versus an identification card. The TIM can also identify a person's name, address, account number, or any other information.

In one embodiment, a process of forming a tactile dot group in a substrate is provided, where the tactile dot group has two or more tactile dots arranged to form a tactilely recognizable character. The process includes forming, for example by embossing, a first one of the tactile dots of the tactile dot group in a first column on the substrate, and after the first tactile dot is formed, embossing a second one of the tactile dots of the tactile dot group in the first column on the substrate.

In another embodiment, a process of forming a tactile identifier mark in a substrate includes embossing at least one tactile dot group in the substrate, each tactile dot group having two or more tactile dots arranged to form a tactilely recognizable character. For each tactile dot group, a first one of the tactile dots is embossed on the substrate in a first column, and after the first tactile dot is embossed, a second one of the tactile dots of the tactile dot group is embossed in the first column on the substrate.

In one embodiment, a substrate processing system includes a substrate input; a substrate output; a substrate transport mechanism configured to transport the substrate from the substrate input to the substrate output; a tactile dot embossing mechanism disposed along the substrate transport mechanism, the tactile dot embossing mechanism including a punch and a die; the die including a punch hole with a center, a planar lip surrounding the punch hole, and sloped walls surrounding and adjoining the planar lip; and a straight line distance from the center to a center point of each sloped wall adjoining the planar lip is equal to or less than approximately 0.039 inches.

In another embodiment, a substrate processing system includes a substrate input, a substrate output, a substrate transport mechanism configured to transport the substrate from the substrate input to the substrate output, and a tactile dot embossing mechanism disposed along the substrate transport mechanism.

In one embodiment, the substrate processing system is a desktop substrate processing mechanism.

In one embodiment, the tactile dot embossing mechanism is configured to permit variable spacing between adjacent tactile dots in a tactile dot group.

In one embodiment, a desktop substrate processing system includes a substrate input; a substrate output; a transport mechanism configured to transport a substrate from the substrate input to the substrate output; and a tactile dot embossing mechanism disposed along the transport mechanism, the tactile dot embossing mechanism configured to permit variable spacing between adjacent tactile dots in a tactile dot group.

In another embodiment, a desktop substrate processing system includes a substrate input; a substrate output; a transport mechanism configured to transport a substrate from the substrate input to the substrate output; and a tactile dot embossing mechanism disposed along the transport mechanism, the tactile dot embossing mechanism including a single punch and die pair that can be used to form all characters in a 6 or 8 dot tactile dot group.

In one example, the tactile dot embossing mechanism includes a single punch and a die pair. The single punch and die pair is used to form all characters in a 6 or 8 dot tactile dot group, and permits the spacing between the embossed tactile dots to be adjusted or varied. The characters in a 6 or 8 dot tactile dot group are the recognized characters in a known coding system such as the Braille alphabet.

In one example, the die can have a die body with a punch hole formed therein, a planar lip surrounding the punch hole, and sloped walls surrounding and adjoining the planar lip. A straight line distance from the center to a center point of each sloped wall adjoining the planar lip is equal to or less than approximately 0.039 inches.

The substrates that can be provided with the tactile dots and tactile dot group(s) can be any substrates that need to be read, recognized, or that visually impaired individuals otherwise tactilely interact with. In one example, the substrates include, but are not limited to, personalized documents such as plastic cards including but not limited to financial (e.g. credit and debit) cards, drivers' licenses, national identification cards, and other plastic cards which bear personalized data unique to the card holder and/or which bear other card or document information, as well as to passports.

DRAWINGS

Figure 6B:
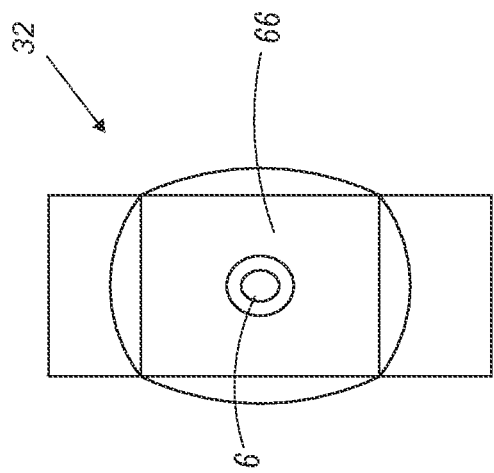
Figure 6C:
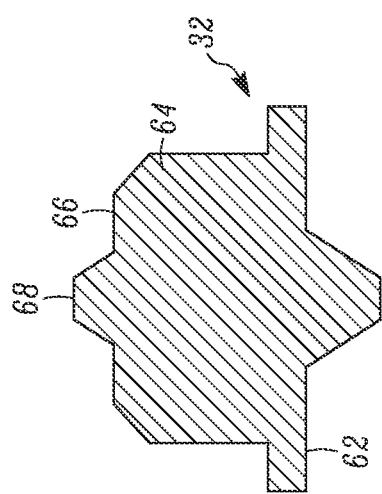
Figure 6A:
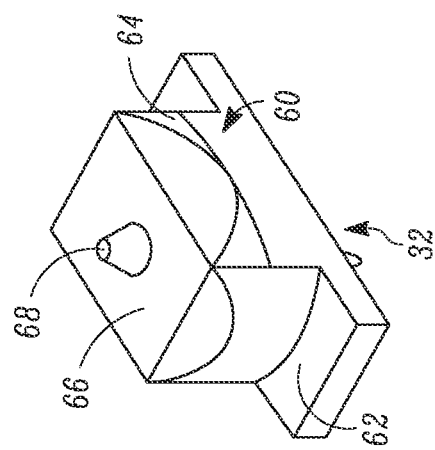

FIGS. 6A-C are perspective, top plan, and cross-sectional views, respectively, of an exemplary punch configuration that can be used in the punch and die pair.

FIGS. 7A-C are perspective, top plan, and cross-sectional views, respectively, of an exemplary die configuration that can be used in the punch and die pair.

FIG. 8 illustrates a plurality of punch and die pairs that can be used to form a tactile dot group.

Figure 9:
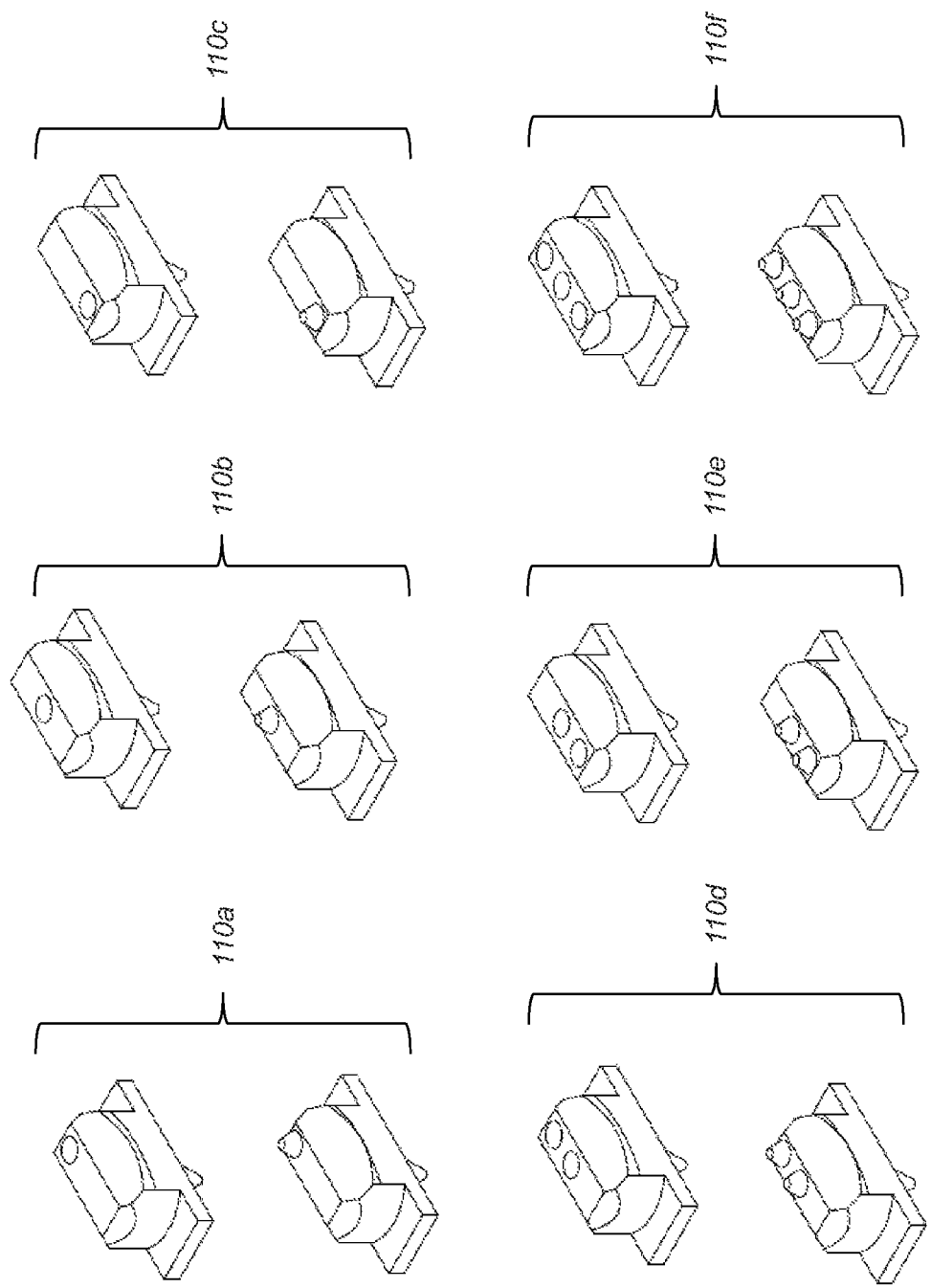

FIG. 9 illustrates another example of a plurality of punch and die pairs that can be used to form a tactile dot group.

Figure 10:
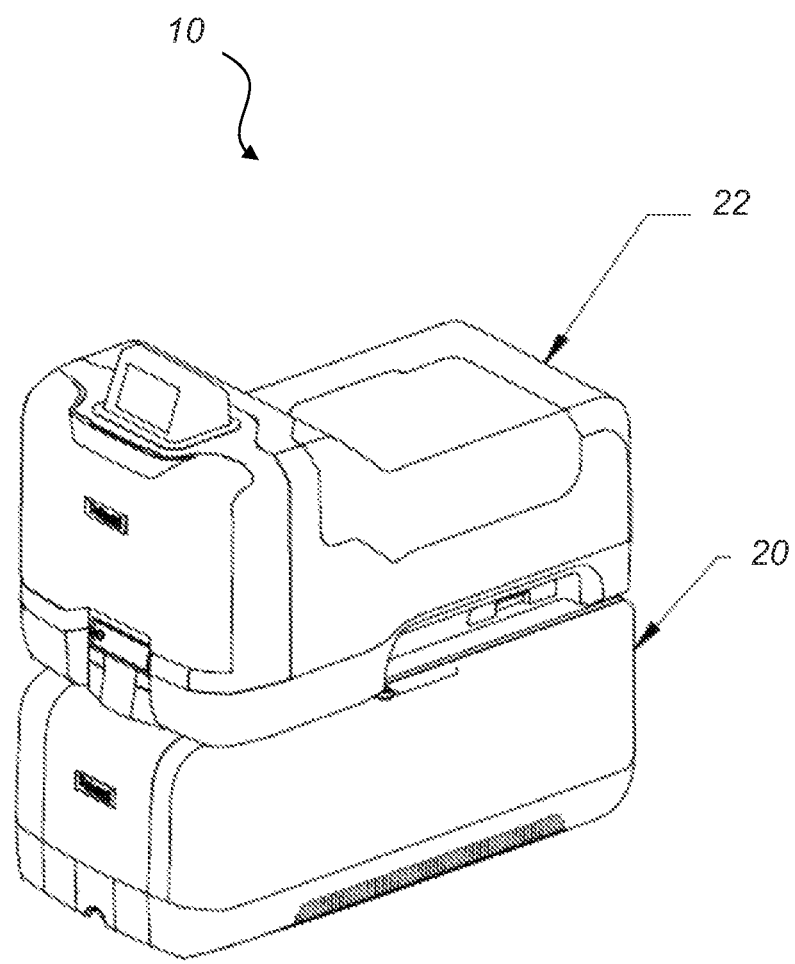

FIG. 10 illustrates an example of a desktop substrate processing system that can incorporate the tactile dot embossing mechanism described herein.

Figure 11:
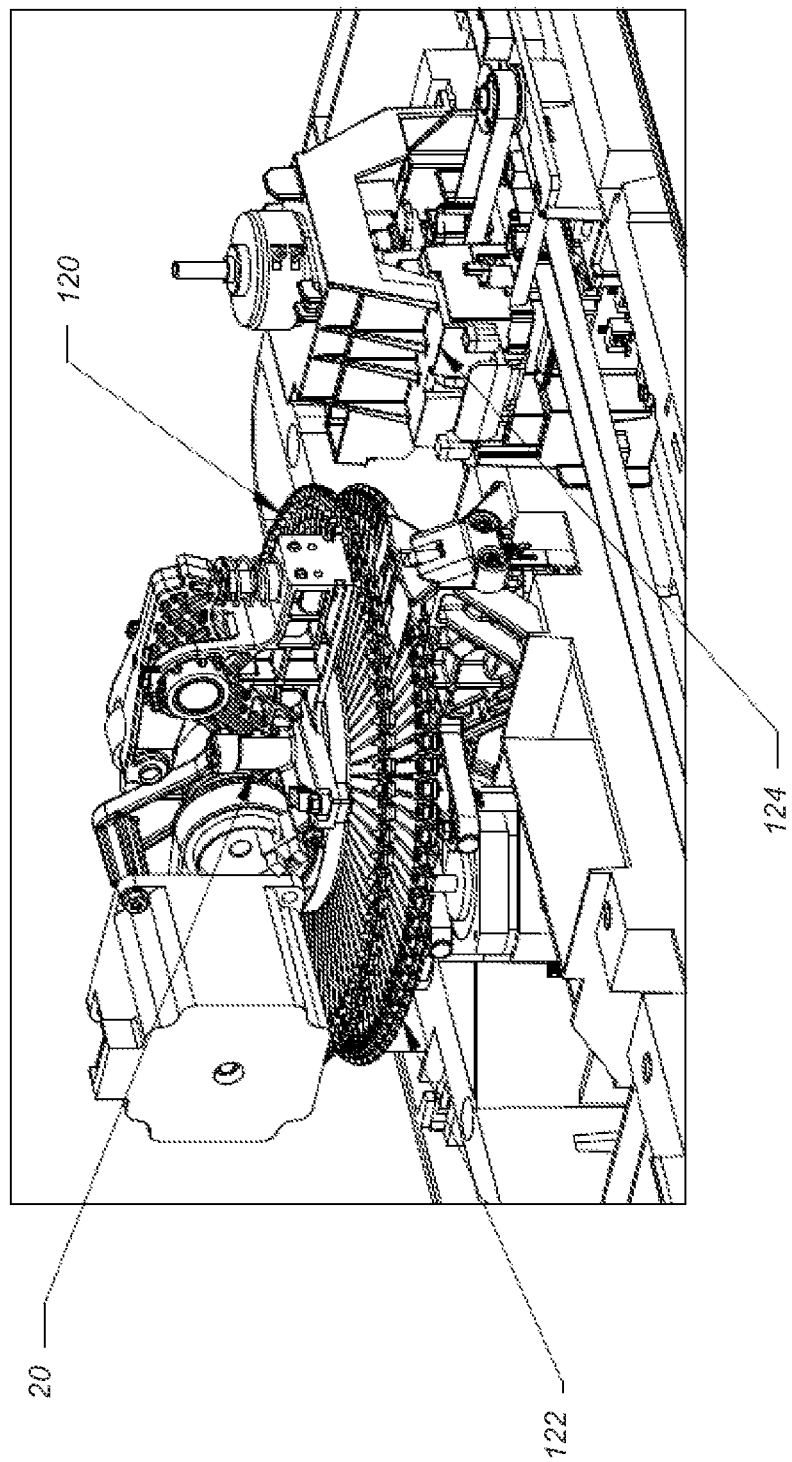

FIG. 11 illustrates details of an exemplary tactile dot embossing mechanism that can be used in the desktop substrate processing system of FIG. 10.

Figure 12:
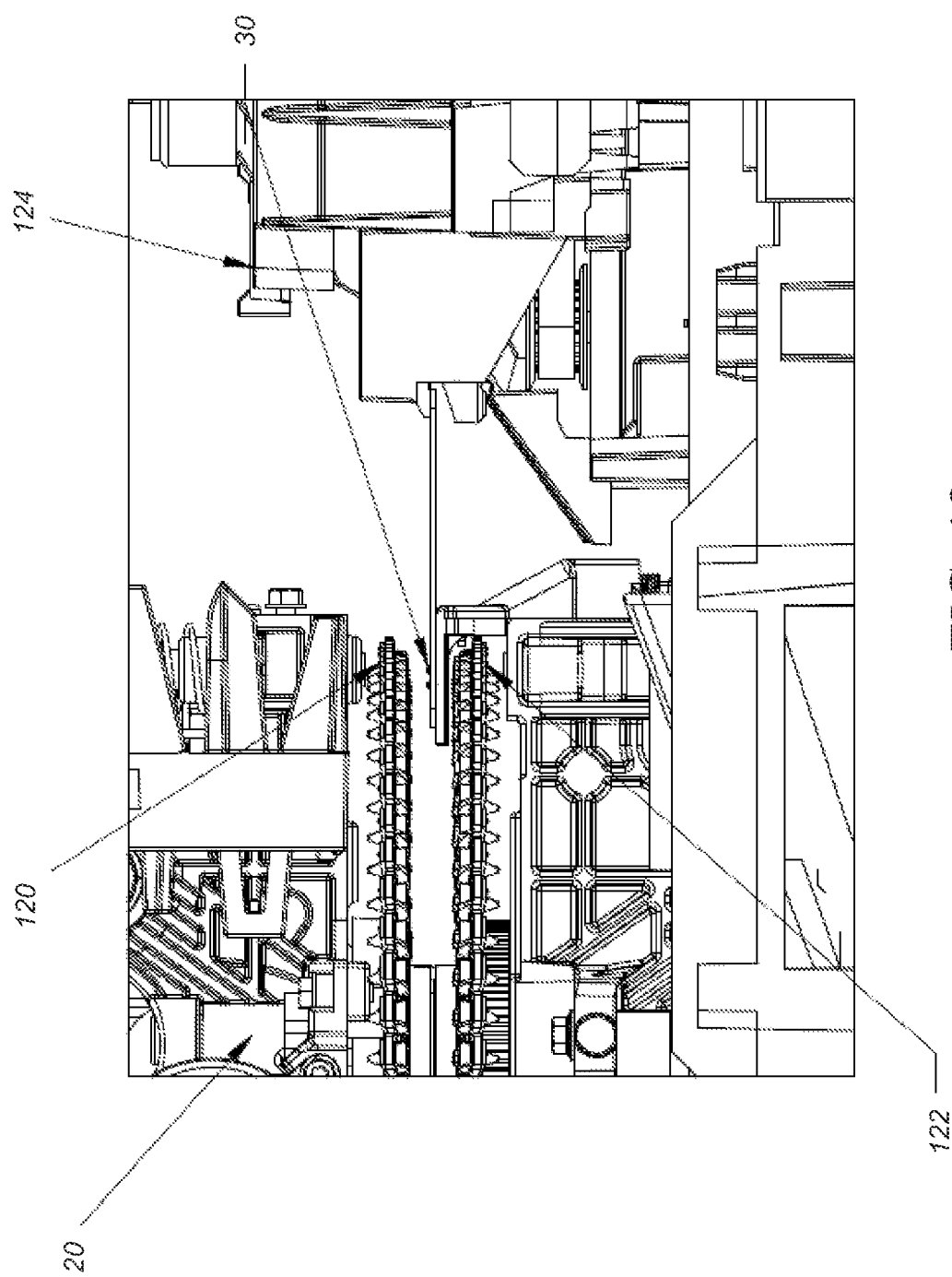

FIG. 12 is a side view of the tactile dot embossing mechanism of FIG. 11 showing a card in position between the punch and die.

DETAILED DESCRIPTION

The following describes techniques for producing tactile dots, tactile dot groups, and tactile identifier marks on substrates. The tactile dots are tactilely recognizable by visually impaired individuals to permit visually impaired individuals to tactilely recognize the dots.

Each tactile dot can be formed individually in the substrate, for example by separately embossing each tactile dot using a single punch and die pair, or by using a mechanism other than embossing, for example using a laser. By forming each dot separately, the spacing between the tactile dots can be varied or adjusted.

Alternatively, in a tactile dot group containing a plurality of tactile dots, the tactile dots of the tactile dot group can be created in separate steps. For example, one or more tactile dots of the dot group can be created in a first step using a first punch and die pair, and one more additional tactile dots of the dot group can be created in a second step using a second punch and die pair. Third, fourth, etc. steps can be used to form additional tactile dots of the dot group using other punch and die pairs. This same process can be used to create the tactile dots of each tactile dot group. Therefore, the various tactile dot groups can be formed using a number of punch and die pairs that is less than the number of different tactile dot groups that can be formed by the plurality of punch and die pairs (i.e. the various tactile dot groups can be formed without having a punch and die pair for each tactile dot group).

The substrates that can be provided with the tactile dots and tactile dot group(s) can be any substrates that need to be read, recognized, or that visually impaired individuals otherwise tactilely interact with. For example, the substrates can include, but are not limited to, personalized documents such as plastic cards including but not limited to financial (e.g. credit and debit) cards, drivers' licenses, national identification cards, and other plastic cards which bear personalized data unique to the card holder and/or which bear other card or document information, as well as to passports.

The tactile dots can be embossed on the substrates in a substrate processing system. The substrate processing system can have a number of configurations, but generally includes a substrate input, a substrate output, a substrate transport mechanism that is configured to transport the substrate from the substrate input to the substrate output, and a means, such as an embossing mechanism or a laser, to create the tactile dots.

In one embodiment, the substrate processing system can be a desktop processing system that is sized to generally fit on a desktop or table and that is generally configured to process substrates one at a time in relatively low volumes (for example, 1 or 2 substrates processed per minute). An example of a desktop substrate processing mechanism is the CE840™ and the CE 870™ Card Personalization Systems available from DataCard Corporation of Minnetonka, Minn.

In another embodiment, the substrate processing system can be a central issuance substrate processing system that is often room sized, configured with multiple processing stations or modules performing different processing tasks, and that is generally configured to process substrates multiple substrates at once in relatively high processing volumes (for example, on the order of hundreds or thousands per hour).

An example of a central issuance substrate processing system is the MX and MPR line of card issuance systems available from DataCard Corporation of Minnetonka, Minn.

For sake of convenience, the tactile dots will primarily be described below as being formed individually (i.e. one tactile dot at a time) by embossing using a single punch and die pair (FIGS. 6A-C and 7A-C). However, in some embodiments, the tactile dots can be formed in other ways, including using multiple punch and die pairs (FIGS. 8 and 9). In addition, for sake of convenience, the substrates will hereinafter be described as being plastic cards. But it is to be realized that the substrates are not limited to plastic cards. Further, for sake of convenience, the substrate processing system will hereinafter be described as being a desktop card processing system, although other types of processing systems could be used.

Figure 1:
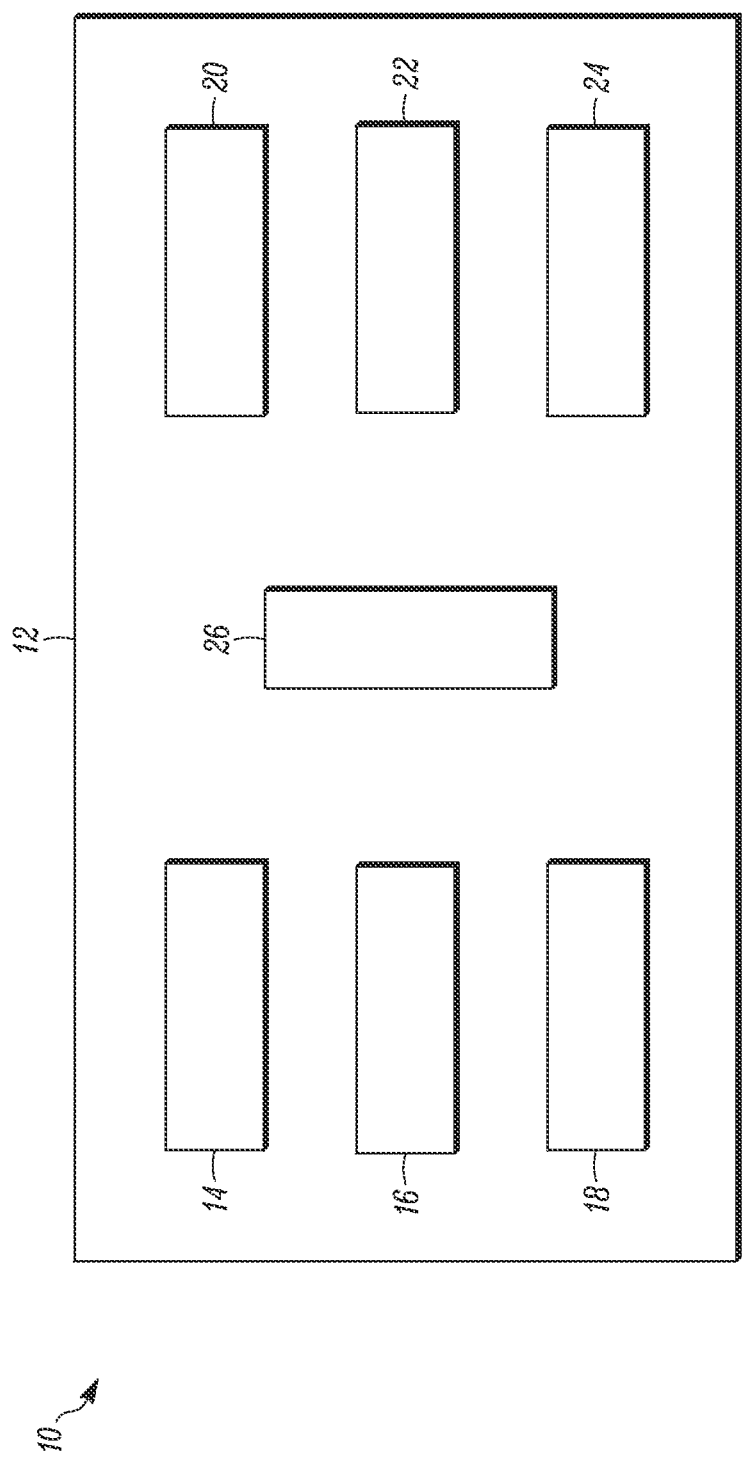
FIG. 1 is a schematic illustration of a substrate processing system that can be used to create the tactile dots described herein.

With reference initially to FIG. 1, a schematic depiction of a desktop card processing system 10 is illustrated. The system 10 includes a housing 12, a card input 14, a card output 16, and a card transport mechanism 18 that is configured to transport the card from the card input to the card output. The system 10 further includes an embossing mechanism 20 that is disposed along the transport mechanism 18 for forming the tactile dots on the cards. The system 10 can optionally include a print mechanism 22 that is disposed along the transport mechanism 18 and that is capable of printing on the card and/or an optional lamination mechanism 24 that is disposed along the transport mechanism 18 and that is capable of applying a laminate to the card over the printing. If used, the print mechanism and the lamination mechanism are preferably disposed upstream of the embossing mechanism 20. The system 10 can also optionally include other card processing mechanisms including, but not limited to, magnetic stripe encoding, smart card programming, and indent printing. The system 10 and the components thereof are controlled by one or more controllers 26.

An example of a desktop card processing system with input, output, card transport and multiple processing stations, including embossing, is disclosed in U.S. Pat. No. 7,434,728 which is incorporated herein by reference in its entirety. The CE840™ and the CE 870™ Card Personalization Systems from DataCard Corporation also disclose desktop card processing systems with embossing and other card processing.

Figure 2:
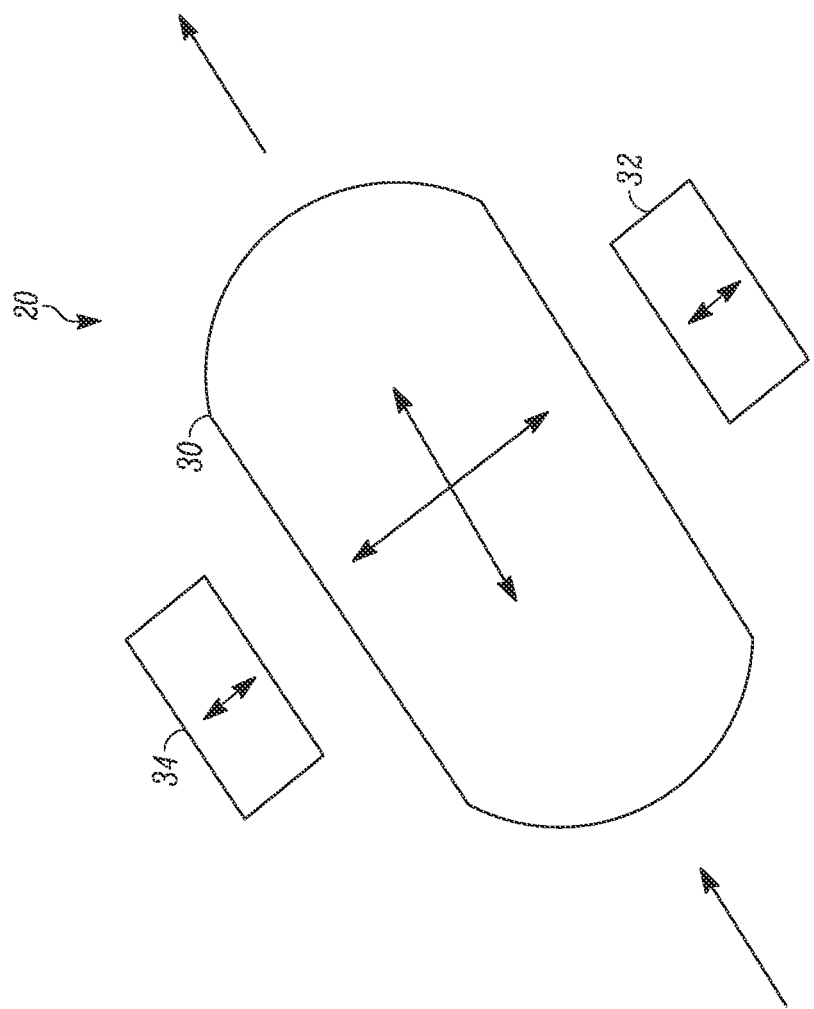
FIG. 2 is a schematic illustration of a tactile dot embossing mechanism used in the substrate processing system of FIG. 1.

FIG. 2 schematically depicts the embossing mechanism 20. A card 30 to which tactile dots are to be applied is input into and removed from the mechanism 20 using the card transport mechanism 18 in a known manner like that in the CE840™ and the CE 870™ Card Personalization Systems. The embossing mechanism 20 includes a single punch 32 and die 34 pair that are actuatable toward and away from the card 30 as illustrated by the arrows to create the tactile dots. The card 30 is supported so as to be actuatable up and down, and forward and backward, relative to the punch 32 and the die 34 as indicated by the arrows, to permit formation of the tactile dots at the correct locations on the card. Examples of suitable mechanisms for moving the card relative to the punch and die is described in published U.S. Patent Application U.S. 2007/0187870, which is incorporated herein by reference in its entirety, as well as in the CE840™ and the CE 870™ Card Personalization Systems.

In use, the card 30 is properly positioned in the embossing mechanism 20 to create the first tactile dot. The punch and die are then actuated toward the card to create the tactile dot, and then actuated away from the card. The card is then repositioned to create the next tactile dot, and the punch and die are then actuated toward the card to create the second tactile dot. This process is repeated for each tactile dot to be formed. It is to be realized that instead of moving the card relative to the punch and die, it is possible to move the punch and die relative to the card to form the tactile dots at the proper locations.

Figure 3:
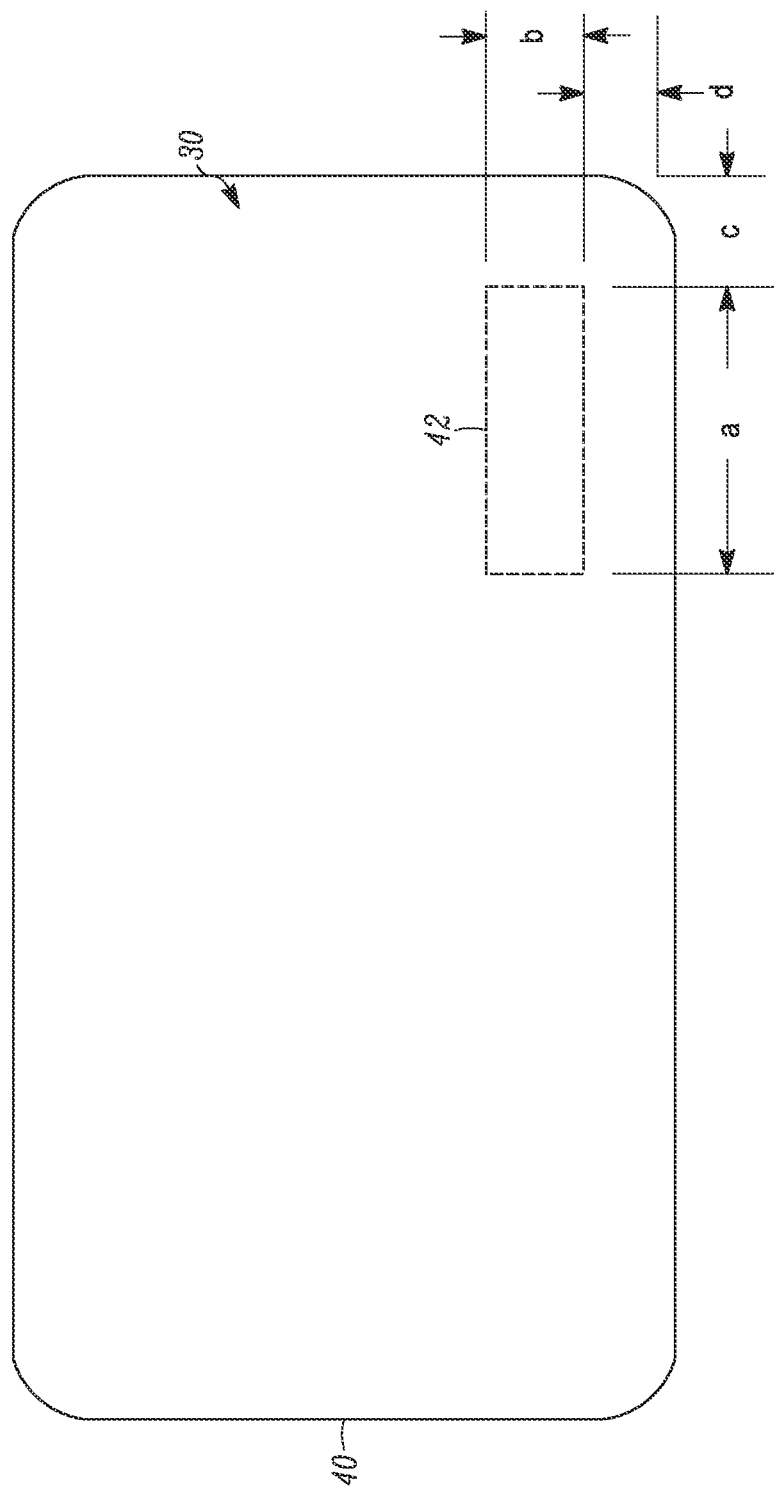
FIG. 3 illustrates an exemplary substrate in the form of a plastic card.
Figure 4:
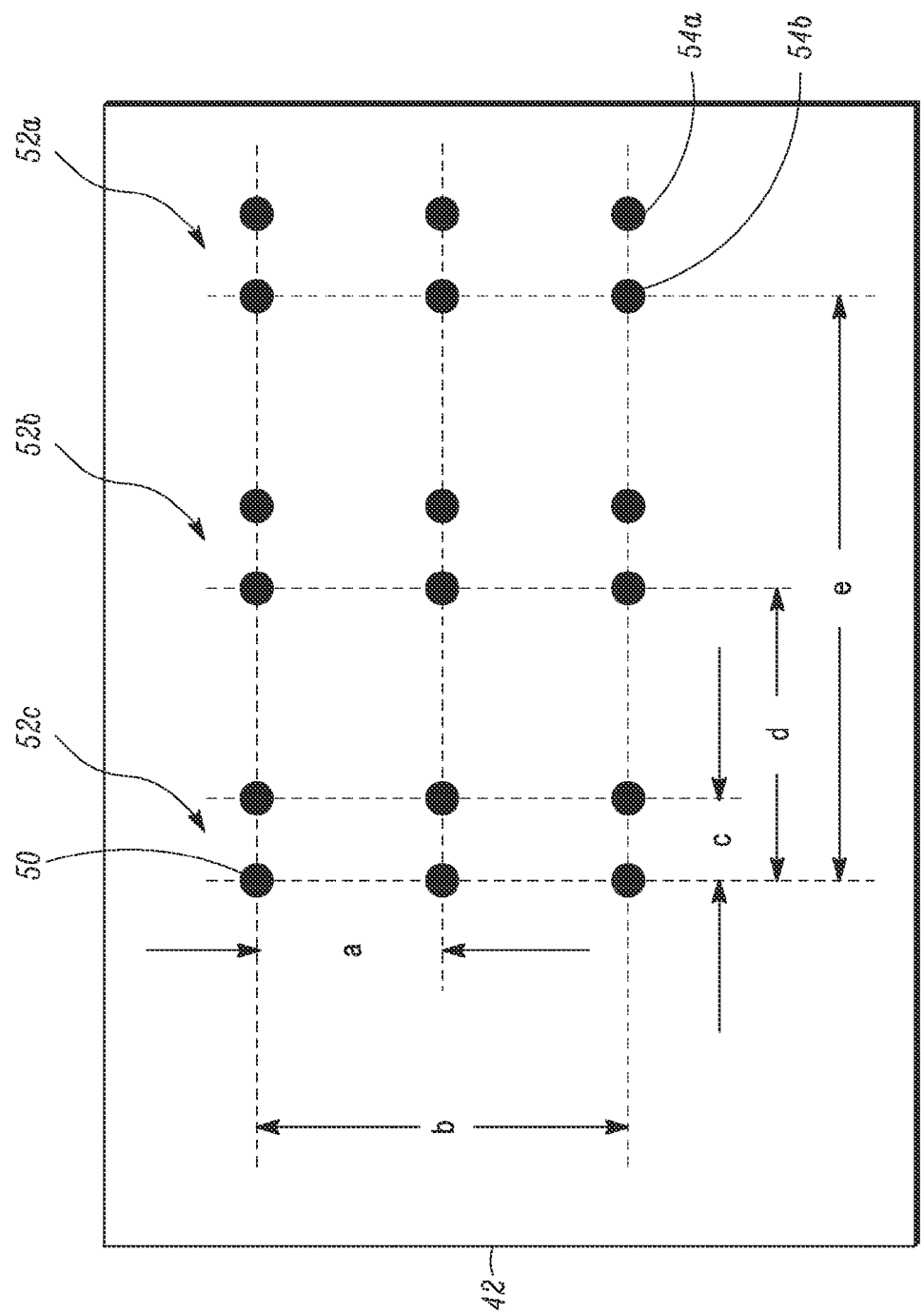
FIG. 4 is a closed-up top plan view of the area contained in the rectangle of FIG. 3 showing an exemplary TIM with tactile dot groups.

With reference now to FIGS. 3 and 4, the tactile dots can be formed at any suitable location on the card 30. For example, the tactile dots can be formed on a front surface 40 of the card 30 (i.e. the tactile dots project above the front surface 30) by deforming the card material from the opposite/rear side, and/or the tactile dots can be formed on a rear surface (not shown) of the card ((i.e. the tactile dots project above the rear surface) by deforming the card material from the opposite/front side. FIG. 3 specifically illustrates an example of the tactile dots being formed generally in a lower, right corner of the card 30 on the front surface 40 within the rectangular area 42. The rectangular area 42 can have the following approximate exemplary dimensions in accordance with ISO/IEC 7811-9:

| | |
|---|---|
| a | 18.5 mm maximum |
| b | 8.0 mm maximum |
| c | 10 ± 1 mm |
| d | 2.92 ± 0.38 mm |

FIG. 4 illustrates a plurality of the tactile dots 50 in the rectangular area 42. The arrangement and locations of the tactile dots form the TIM. The tactile dots 50 are divided into a plurality of tactile dot groups 52a, 52b, 52c although a larger or smaller number of dot groups can be used. Each individual tactile dot group 52a-c forms a tactilely recognizable character based on the number and locations of the tactile dots 50 in each dot group. Each tactile dot group 52a-c is formed by a maximum of two columns 54a, 54b.

The tactilely recognizable characters of the dot groups 52a-c form the TIM. In one embodiment, the TIM can be formed from a maximum of 3 dot groups and a minimum of at least one dot group, with each dot group having up to 6 tactile dots arranged in two columns and a minimum of 1 tactile dot in one of the columns. In the illustrated example where up to three dot groups can be used and a maximum of 6 dots in each dot group, the minimum number of tactile dots that can form the TIM is 1 (i.e. one dot group with a single tactile dot in a single column forms the TIM) and the maximum number of dots that can form the TIM is 18 (i.e. the TIM is formed by the 3 dot groups with each dot group having 6 tactile dots arranged in two columns).

The arrangement and approximate dimensions of the tactile dots 50 and the dot groups 52a-c can be as follows in accordance with ISO/IEC 7811-9:

| | |
|---|---|
| a | 2.3 mm |
| b | 4.6 mm |
| c | 2.3 mm |
| d | 6.1 mm |
| e | 12.2 mm |

Figure 5A:
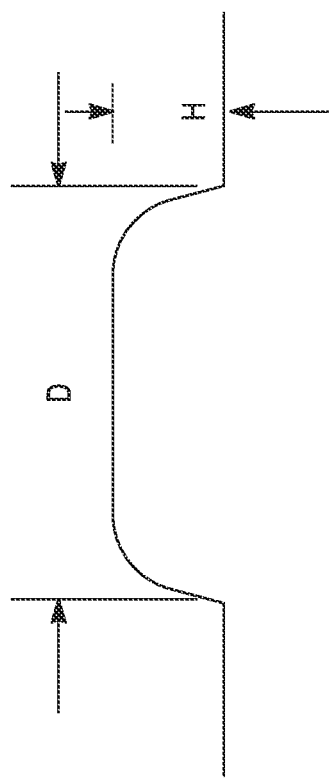
FIGS. 5A and 5B are side views of exemplary tactile dot shapes that can be used.
Figure 5B:
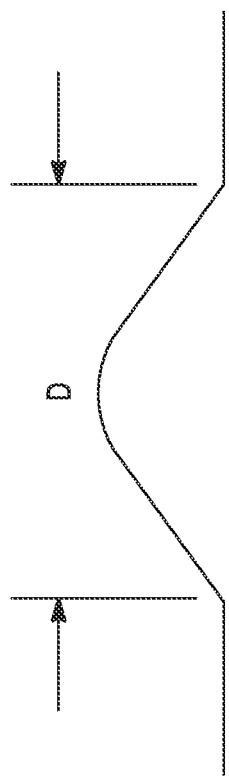

As seen in FIG. 4, the tactile dots 50 are generally circular when viewed in top plan view. However, the tactile dots could have other shapes in top plan view. FIGS. 5A and 5B illustrate exemplary shapes for the tactile dots in a side view. For example, the tactile dots can be generally frusto-conical as shown in FIG. 5A or they can be a continuous convex shape as shown in FIG. 5B. Other dot shapes in side view can also be used.

In each of the examples of FIGS. 5A and 5B, the dots can have a base diameter D of about 1.45±0.2 mm in accordance with ISO/IEC 7811-9. In addition, in each of the examples of FIGS. 5A and 5B, the dots can have a relief height H of between about 0.3 mm to about 0.48 mm above the adjacent surface of the card in accordance with ISO/IEC 7811-9.

The examples described above and illustrated in FIG. 4 employ dot groups of a maximum of 6 tactile dots 50. However, dot groups using a maximum of 8 tactile dots arranged in two columns and a minimum of 1 tactile dot can be used. In addition, a mixture of 6 dot groups and 8 dot groups can be used.

With reference now to FIGS. 6A-C and 7A-C, exemplary embodiments of the punch 32 and the die 34 pair that can be used to form the tactile dots 50 are illustrated. In the illustrated examples, the punch 32 and the die 34 are configured to form one tactile dot at a time. However, as discussed further below with respect to FIGS. 8 and 9, the punch and the die can be configured to form more than one tactile dot at a time, but less than the total number of dots needed for any tactile dot group.

The punch 32 includes a punch body 60 that is generally rectangular in shape. The punch body 60 includes a base portion 62 and a protruding portion 64. The protruding portion includes a planar surface 66 from which a punch element 68 projects that engages the card to deform the card and thereby form the shape of the tactile dots 50. The punch element 68 should have a shape that corresponds to the desired shape of the tactile dots 50. In this example, the punch element 68 is generally frusto-conically shaped. The planar surface 66 surrounds the punch element 68 so that the area around each tactile dot that is formed is not deformed by the punch 32.

The die 34 includes a die body 80 that is generally rectangular in shape. The die body 80 includes a base portion 82 and a protruding portion 84. The end of the protruding portion 84 includes a punch hole 86 formed therein that in use receives the deformed material of the card and the punch element 68 during an embossing operation to form a tactile dot 50.

Surrounding the punch hole 86 is a planar lip 88, and sloped walls 90a-d surround and adjoin the planar lip 88. The construction of the planar lip 88 and the sloped walls 90a-d is important since the die needs to be able to contact the opposite surface of the card without contacting previously formed tactile dots 50. If the die 34 does make contact with previously formed dots 50, the die could push those dots inward back into the card. Therefore, the planar lip 88 is sized, and the walls 90a-d are sloped, to permit the die to engage with the card surface during embossing of one of the tactile dots 50 without the die engaging any previously formed tactile dots 50.

In the illustrated example, the planar lip 88 is sized in a manner such that straight line distances X from a center of the punch hole 86 to a center point Y of each sloped wall 90a-d adjoining the planar lip 88 is equal to or less than approximately 0.039 inches. In addition, as best seen in FIG. 7C, each of the walls 90a-d can be sloped at an angle α of, for example, from about 40 degrees to about 60 degrees. In another example, the angle α is about 45 degrees.

FIG. 8 illustrates an example where the tactile dot embossing mechanism 20 is provided with 3 punch and die pairs 100a, b, c. The pairs 100a, 100b are each configured to form a single tactile dot 50 at a time, while the pair 100c is configured to simultaneously form a pair of tactile dots 50. The punches and dies in each pair 100a-c are configured somewhat similarly to the punch 32 and the die 34. In FIG. 8, elements that are similar to elements in FIGS. 6A-C and 7A-C are referenced using the same reference numeral but with a prime character. The punch and die pairs 100a-c in FIG. 8 can be used to form, for example, complete 6 or 8 dot tactile dot groups.

In FIG. 8, each die includes a planar lip 88', and sloped walls 90'a-d surrounding and adjoining the planar lip to permit each of the dies to contact the opposite surface of the card without contacting previously formed tactile dots. Therefore, for each die, the planar lip is sized, and the walls are sloped, to permit the die to engage with the card surface during embossing without the die engaging any previously formed tactile dots. In the examples in FIG. 8, the dies of each pair 100a-c are also provided with a planar surface 66'.

FIG. 9 illustrates another example where the tactile dot embossing mechanism 20 is provided with 6 punch and die pairs 110a-f. The pairs 110a-c are each configured to form a single tactile dot 50 at a time, the pairs 110d-e are each is configured to simultaneously form a pair of tactile dots 50, while the pair 110f is configured to simultaneously form 3 tactile dots 50. The punches and dies in each pair 110a-f are configured somewhat similarly to the punch 32 and the die 34 and to the pairs 100a-c shown in FIG. 8. In FIG. 9, elements that are similar to elements in FIGS. 6A-C and 7A-C are referenced using the same reference numeral but with a double prime character. The punch and die pairs 110a-f in FIG. 9 can be used to form, for example, complete 6 or 8 dot tactile dot groups.

With the embodiments illustrated in FIGS. 8 and 9, each tactile dot group can be formed using a plurality of punch and die pairs that is less in number than the number of different dot groups that can be formed by the plurality of punch and die pairs. In other words, each of the various dot groups can be formed without having a punch and die pair specific to each desired dot group. This helps to reduce the size, complexity and cost of the embossing mechanism.

FIG. 10 illustrates an example of the desktop substrate processing system 10. In this example, the system 10 includes the print mechanism 22 disposed vertically above the tactile dot embossing mechanism 20. Further details of implementing such a vertical configuration of a printer and embossing combination can be found in the CE 870™ Card Personalization System.

With reference to FIGS. 11 and 12, details of one example of the tactile dot embossing mechanism 20 used in the desktop substrate processing system 10 of FIG. 10 are illustrated. As illustrated in FIG. 11, the embossing mechanism 20 can include an upper rotatable wheel 120 containing the die(s) 34 and a lower rotatable wheel 122 containing the punch(es) 32. As best seen in FIG. 12, the wheels 120, 122 are spaced from one another to define a gap that allows the substrate 30, in this example a plastic card, to be positioned between the wheels 120, 122 during embossing of the tactile dots. The embossing mechanism 20 includes a substrate support and transport 124 that receives the substrate 30 from the transport mechanism 18, properly positions and the substrate relative to the wheels to emboss a tactile dot, repositions the substrate relative to the wheels after each tactile dot is embossed, holds the substrate 30 during embossing, and moves the substrate to the transport mechanism 18 after all of the tactile dots have been embossed. Further details on rotatable embossing wheels and a substrate support and transport can be found in the CE 870™ Card Personalization System.

The embodiments disclosed in this application are to be considered in all respects as illustrative and not limitative. The scope of the claimed invention is indicated by any appended claims rather than by the foregoing description, and all changes which come within the meaning and range of equivalency of the claims are intended to be embraced therein.

What is claimed is:

1. A process of forming a tactile dot group in a plastic card or a passport, the tactile dot group having two or more tactile dots arranged to form a tactilely recognizable character, comprising:
    embossing a first one of the tactile dots of the tactile dot group in a first column on the plastic card or passport using a punch and a die that has a single punch hole, the single punch hole of the die is defined by a center, a planar lip surrounding the single punch hole, and sloped walls surrounding and adjoining the planar lip;
    after the first tactile dot is formed, embossing a second one of the tactile dots of the tactile dot group in the first column on the plastic card or passport using the punch and the die;
    the first tactile dot and the second tactile dot of the tactile dot group are part of a tactile identifier mark that forms personal information of a holder of the plastic card or passport, and the plastic card or passport is a personalized plastic card or a personalized passport.

2. The process of claim 1, further comprising:
    after the second tactile dot is formed, embossing a third one of the tactile dots of the tactile dot group on the plastic card or passport.

3. The process of claim 1, wherein a straight line distance from the center to a center point of each sloped wall adjoining the planar lip is equal to or less than approximately 0.039 inches.

4. The process of claim 1, wherein the sloped walls are disposed at an angle of from about 40 degrees to about 60 degrees relative to the planar lip.

5. The process of claim 1, wherein the tactile identifier mark complies with ISO/IEC 7811-9 or is a Braille character.

6. The process of claim 1, wherein the first tactile dot and the second tactile dot comply with ISO/IEC 7811-9.

7. A personalized plastic card or passport processing system comprising:
    a plastic card or passport input;
    a plastic card or passport output;
    a transport mechanism configured to transport a plastic card or passport from the plastic card or passport input to the plastic card or passport output; and
    a tactile dot embossing mechanism disposed along the transport mechanism, the tactile dot embossing mechanism is configured to permit variable spacing between adjacent tactile dots in a tactile dot group that is part of a tactile identifier mark that forms personal information of a holder of the plastic card or passport, the tactile dot embossing mechanism includes at least one punch and die pair that includes a punch and a die, and the die has a single punch hole;
    the single punch hole of the die is defined by a center, a planar lip surrounding the single punch hole, and sloped walls surrounding and adjoining the planar lip.

8. The personalized plastic card or passport processing system of claim 7, wherein the system is a desktop plastic card or passport processing mechanism.

9. The personalized plastic card or passport processing system of claim 8, wherein the tactile dot embossing mechanism comprises a single punch and die pair that can be used to form all characters in a 6 or 8 dot tactile dot group.

10. The personalized plastic card or passport processing system of claim 7, wherein the system is a multi-station, central issuance plastic card or passport processing mechanism.

11. The personalized plastic card or passport processing system of claim 7, wherein
    a straight line distance from the center to a center point of each sloped wall adjoining the planar lip is equal to or less than approximately 0.039 inches.

12. The personalized plastic card or passport processing system of claim 7, wherein the sloped walls are disposed at an angle of from about 40 degrees to about 60 degrees relative to the planar lip.

13. The personalized plastic card or passport processing system of claim 7, further including a print mechanism disposed along the plastic card or passport transport mechanism and capable of printing on the plastic card or passport and/or a lamination mechanism disposed along the plastic card or passport transport mechanism and capable of applying a laminate to the plastic card or passport; and the print mechanism and the lamination mechanism are disposed upstream of the tactile dot embossing mechanism.

14. The process of claim 1, wherein after the first tactile dot is formed and prior to embossing the second one of the tactile dots, moving the plastic card or passport and the punch and die relative to one another in two mutually orthogonal directions in order to position the plastic card or passport relative to the punch and die for formation of the second one of the tactile dots.

15. The personalized plastic card or passport processing system of claim 7, wherein the plastic card or passport and the punch and die are movable relative to one another in two mutually orthogonal directions.

16. The process of claim 1, wherein the personal information of the holder of the plastic card or passport comprises the holder's name, the holder's address, or an account number.

17. The personalized plastic card or passport processing system of claim 7, wherein the personal information of the holder of the plastic card or passport comprises the holder's name, the holder's address, or an account number.

* * * * *